(12) United States Patent
Le Roux et al.

(10) Patent No.: US 7,852,840 B2
(45) Date of Patent: Dec. 14, 2010

(54) METHOD AND DEVICE FOR CREATING A TUNNEL IN A LABEL-SWITCHED TELECOMMUNICATION NETWORK

(75) Inventors: Jean-Louis Le Roux, Lannion (FR); Gaël Fromentoux, Pleumeur-Bodou (FR); Thang Vu Duong, Ploulec'h (FR)

(73) Assignee: France Telecom, Paris (FR)

( * ) Notice: Subject to any disclaimer, the term of this patent is extended or adjusted under 35 U.S.C. 154(b) by 677 days.

(21) Appl. No.: 11/664,909

(22) PCT Filed: Sep. 28, 2005

(86) PCT No.: PCT/FR2005/002405

§ 371 (c)(1), (2), (4) Date: Oct. 29, 2007

(87) PCT Pub. No.: WO2006/040430

PCT Pub. Date: Apr. 20, 2006

(65) Prior Publication Data

US 2008/0144641 A1  Jun. 19, 2008

(30) Foreign Application Priority Data

Oct. 8, 2004 (FR) ............................. 04 10674

(51) Int. Cl.
*H04L 12/28* (2006.01)
(52) U.S. Cl. .............. 370/389; 370/228; 370/235; 370/386; 370/392; 709/203; 709/227; 709/243
(58) Field of Classification Search .......... 370/228, 370/230, 235, 386, 389, 392, 395, 53, 401; 709/203, 227, 243
See application file for complete search history.

(56) References Cited

U.S. PATENT DOCUMENTS

| 6,680,943 | B1 * | 1/2004 | Gibson et al. | 370/392 |
| 6,973,504 | B2 * | 12/2005 | Nomura | 709/235 |
| 7,046,669 | B1 * | 5/2006 | Mauger et al. | 370/393 |
| 7,508,769 | B1 * | 3/2009 | Duffield et al. | 370/252 |
| 7,519,056 | B2 * | 4/2009 | Ishwar et al. | 370/389 |
| 7,574,738 | B2 * | 8/2009 | Daude et al. | 726/15 |

(Continued)

FOREIGN PATENT DOCUMENTS

EP 1 187 406 A 3/2002

(Continued)

*Primary Examiner*—Ayaz R Sheikh
*Assistant Examiner*—Andrew C Lee
(74) *Attorney, Agent, or Firm*—Cohen Pontani Lieberman & Pavane LLP

(57) ABSTRACT

A method of creating a tunnel for transporting at least one data flow in a label-switched telecommunication network, the telecommunication network comprising at least one ingress edge router, a server able to define tunnels, called static tunnels, in the telecommunication network based on traffic forecasts in the telecommunication network. The method includes the steps, performed by an ingress edge router receiving an admission request from a client to transfer a data flow in the telecommunication network, of determining whether a static tunnel defined by the server in the telecommunication network is able to transport the data flow, creating a tunnel, called dynamic tunnel, able to transport the data flow in the telecommunication network if no static tunnel defined by the server is able to transport the data flow.

15 Claims, 4 Drawing Sheets

U.S. PATENT DOCUMENTS

| | | | |
|---|---|---|---|
| 2004/0006613 A1* | 1/2004 | Lemieux et al. | 709/223 |
| 2004/0093492 A1* | 5/2004 | Daude et al. | 713/156 |
| 2004/0223498 A1* | 11/2004 | Sanderson et al. | 370/395.52 |
| 2004/0223500 A1* | 11/2004 | Sanderson et al. | 370/395.53 |
| 2005/0086367 A1* | 4/2005 | Conta et al. | 709/238 |
| 2009/0182874 A1* | 7/2009 | Morford et al. | 709/224 |
| 2009/0274161 A1* | 11/2009 | Liu | 370/412 |

FOREIGN PATENT DOCUMENTS

| | | |
|---|---|---|
| WO | WO 02/082720 A | 10/2002 |
| WO | WO 03/010923 | 2/2003 |

* cited by examiner

| | 43 | 44 | 45 | 46 | 47 | 48 | 49 |
|---|---|---|---|---|---|---|---|
| | @d_t | c_t | bp_t | d_t | bptu | Dir | bpr |
| 40 — Tunnel 1 | 2.2.2 | EF | 100M | 10ms | 80M | uni | 20M |
| 41 — Tunnel 2 | 2.2.2 | AF | 100M | 100ms | 95M | bir | 5M |
| 42 — Tunnel 3 | 3.3.3 | ... | ... | ... | ... | ... | ... |

Fig. 4

| | 510 | 511 | 512 | 513 | 514 | 515 | 516 | 517 | 518 | 519 | 520 |
|---|---|---|---|---|---|---|---|---|---|---|---|
| | @s_f | @d_f | pr | ps | pd | c_f | bp_f | d_f | dest | Id | Dir |
| 500 — Flow 1 | 1.1.1 | 2.2.2 | 1 | 2 | 1 | EF | 10M | 100ms | 5.5.5 | 50 | uni |
| 501 — Flow 2 | ... | ... | ... | ... | ... | ... | ... | ... | ... | ... | ... |
| 502 — Flow 3 | ... | ... | ... | ... | ... | ... | ... | ... | ... | ... | ... |

Fig. 5

METHOD AND DEVICE FOR CREATING A TUNNEL IN A LABEL-SWITCHED TELECOMMUNICATION NETWORK

RELATED APPLICATIONS

This is a U.S. National Phase Application under 35 USC 371 of International Application PCT/FR2005/002405 filed on Sep. 28, 2005.

FIELD OF THE INVENTION

The present invention relates to a method and a device for creating a tunnel for transporting at least one data flow in a label-switched telecommunication network.

BACKGROUND OF THE INVENTION

The MPLS standard, published under the auspices of the IETF (Internet Engineering Task Force) is a technique based on label switching which can be used to create a connection-oriented network from a datagram-type network such as the IP network. Detailed documentation of the MPLS protocol can be found on the Internet at www.ietf.org.

FIG. 1 diagrammatically shows an MPLS network 150 comprising a plurality of routers called LSR (label switching router) such as 100a, 100b, 110a, 110b, 110c and 120 inter-linked by IP links. When an IP packet arrives at an ingress edge router 100a or 100b, called Ingress LSR, the latter assigns it a label according to its IP header and concatenates it with said packet. The router receiving the labeled packet replaces the label (incoming) with an outgoing label according to its routing table and the process is repeated from router to router as far as the egress edge router 120 (also called egress LSR) which deletes the label before transmitting the packet. Alternatively, the label deletion may already have been done by the penultimate router since the egress router 120 does not use the incoming label. An LSR router uses the label of the incoming packet (incoming label) to determine the output port and label of the outgoing packet (outgoing label). The path taken by a packet through the network from the ingress router 100a to the egress router 120 is called label-switched path (LSP). According to the example of FIG. 1 in which a path is represented by the arrows 105a, 105b and 105c, the LSR routers 110a, 110c crossed by the path and distinct from the ingress 100a and egress 120 edge routers are called transit routers. Also, the term "equivalence class" or "forward equivalence class" (FEC) is used to denote the set of IP packets that are transmitted along one and the same path.

The MPLS protocol makes it possible to force the IP packets to follow a pre-established LSP path which is not normally the optimal IP path in terms of number of hops or path metric. The technique for determining the path or paths to be taken is called traffic engineering or MPLS-TE (MPLS Traffic Engineering). The determination of the path takes account of the constraints on the available resources (constraint-based routing), particularly in terms of bandwidth on the various network links. Unlike the conventional IGP routing that works in a hop-by-hop mode (hop-by-hop routing), an LSP path is determined according to a so-called explicit mode (explicitly routed LSP or ER-LSP) wherein some or all of the nodes of the path from the ingress router to the egress router are determined. When all the nodes of the path are fixed, the routing can be called an "explicit routing" in the strict sense. A path determined by an explicit mode is also called MPLS tunnel.

Recommendation RFC 3564 entitled "Requirements for Support of Differentiated Services-aware MPLS Traffic Engineering", hereinafter called DS-TE, makes it possible to set up MPLS tunnels guaranteeing a quality of service. A DS-TE tunnel that is unidirectional or bidirectional is set up between two edge routers along a path that observes a set of quality of service constraints such as bandwidth, service class and delay.

The determination of a tunnel is carried out centrally or in a distributed fashion. The centralized tunnel determination systems try to coordinate the placement of the tunnels in the label-switched communication network so as to optimize the use of the network resources. These systems are not well suited to use in a large scale network and are not very robust to abrupt changes in clients' needs.

Distributed tunnel determination systems try to place the tunnels in the network so as to react to changing clients' needs. The tunnel placement is normally performed by devices commonly called tunnel heads. Tunnel placements in distributed systems do not allow for a coordinated placement of the tunnels in the label-switched communication network and are often intensive network resource consumers.

SUMMARY OF THE INVENTION

An object of the invention is to resolve the drawbacks of the prior art by proposing a method and a device for creating tunnels in a label-switched telecommunication network wherein the creation of certain tunnels is performed in a coordinated way so as to optimize the resources of the telecommunication network, and wherein the creation of other tunnels can be performed quickly and on demand so as to accommodate an unpredictable increase in the traffic in the telecommunication network.

To this end, according to a first aspect, the invention proposes a method of creating a tunnel for transporting at least one data flow in a label-switched telecommunication network, the telecommunication network comprising at least one ingress edge router, a server able to define tunnels, called static tunnels, in the telecommunication network based on traffic forecasts in the telecommunication network.

According to the invention, this method comprises the following steps, performed by an ingress edge router receiving a request from a client to transfer a data flow in the telecommunication network, for:
  determining whether a static tunnel defined by the server in the telecommunication network is able to transport the data flow,
  creating a tunnel, called dynamic tunnel, able to transport the data flow in the telecommunication network if no static tunnel defined by the server is able to transport the data flow.

Correlatively, the invention relates to a device for creating a tunnel for transporting at least one data flow in a label-switched telecommunication network, the telecommunication network comprising at least one ingress edge router, a server able to define tunnels in the telecommunication network based on traffic forecasts in the telecommunication network.

According to the invention, this tunnel creation device is included in an ingress edge router and the tunnel creation device comprises:
  means of determining whether a tunnel defined by the server in the telecommunication network is able to transport the data flow,
  means of creating a tunnel suitable for transporting the data flow if no static tunnel defined by the server is able to transport the data flow.

Thus, the creation of static tunnels is performed in a coordinated way by a server and so to optimize the resources of the telecommunication network; the dynamic tunnel creation is performed in a distributed way by each ingress edge router quickly and on demand so as to cope with the congestion of the static tunnels. By performing tunnel creation in two different ways, one centralized and the other distributed, tunnel creation is optimized. Finally, by creating dynamic tunnels only when the static tunnels are not able to transport, the creation of too many dynamic tunnels is avoided.

According to another aspect of the invention, each tunnel has associated with it, among other things, service class, tunnel reserved bandwidth and transit delay parameters.

Thus, it is possible to guarantee a very precise quality of service in the telecommunication network.

According to another aspect of the invention, prior to the creation of a dynamic tunnel, a determination is made as to whether the dynamic tunnels created previously include at least one dynamic tunnel able to transport the data flow.

Thus, when a dynamic tunnel is created, an effort is made to use the resources allocated to this tunnel in the telecommunication network optimally.

According to another aspect of the invention, if no dynamic tunnel created previously is able to transport the data flow, prior to the creation of a dynamic tunnel, a determination is made as to whether the dynamic tunnels created previously include at least one dynamic tunnel able to transport the data flow if the reserved bandwidth of said tunnel is increased by a predetermined value.

Thus, by modifying the parameters of a previously created dynamic tunnel, there is no need to create a new dynamic tunnel and an over-multiplication of dynamic tunnels in the telecommunication network is thus avoided.

According to another aspect of the invention, if the dynamic tunnels created previously include at least one dynamic tunnel able to transport the data flow if the reserved bandwidth of said tunnel is increased by a predetermined value, the reserved bandwidth of said tunnel increased by a predetermined value is compared with a predetermined threshold and the tunnel or tunnels for which the reserved bandwidth increased by a predetermined value is less than a predetermined threshold are selected.

Thus, the increase in the reserved bandwidth of the dynamic tunnels is controlled.

According to another aspect of the invention, a determination is made as to whether the routing of the selected tunnel or tunnels in the label-switched telecommunication network needs to be modified, and the tunnel or tunnels for which the routing in the label-switched telecommunication network must not be modified are selected.

According to another aspect of the invention, each tunnel is characterized at least by a residual bandwidth and, when several tunnels for which the routing in the label-switched telecommunication network must not be modified are selected, from the tunnels for which the routing in the label-switched telecommunication network must not be modified, the tunnel or tunnels for which the residual bandwidth is the lowest out of the dynamic tunnels able to transport the data flow are selected and, when several dynamic tunnels able to transport the data flow have the same residual bandwidth, the dynamic tunnel or tunnels for which the reserved bandwidth is the lowest are selected and, when several dynamic tunnels are able to transport the data flow and have the same reserved bandwidth, the dynamic tunnel for which the delay is the greatest is selected.

Thus, when a dynamic tunnel is created, an effort is made to use the resources allocated to this tunnel in the telecommunication network optimally.

According to another aspect of the invention, the data flow is intended for a correspondent of the client and the telecommunication network comprises at least one egress edge router with which the correspondent of the client is associated and each tunnel also has associated with it the address of an ingress edge router, the address of an egress edge router, the bidirectionality or otherwise of said tunnel, the logical bandwidth used in the tunnel corresponding to the sum of the bandwidths of the data flows transported in the tunnel and the residual bandwidth of the tunnel corresponding to the difference between the reserved bandwidth of the tunnel in the telecommunication network and the logical bandwidth used in the tunnel.

Thus, it is possible to guarantee a very precise quality of service in the telecommunication network.

According to another aspect of the invention, a tunnel is able to transport a data flow if the address of the egress edge router with which the correspondent of the client is associated is equal to the address of the egress edge router of the tunnel, the address of the ingress edge router with which the client is associated is equal to the address of the ingress edge router of the tunnel, the service class of the tunnel is at least greater than the service class of the data flow, the transit delay of the tunnel is less than or equal to the transit delay of the data flow and if the residual bandwidth of the tunnel is greater than or equal to the bandwidth of the data flow.

Thus, it is possible, for a data flow having a precise quality of service requirement, to guarantee this quality of service in the telecommunication network.

According to another aspect of the invention, when several tunnels are able to transport the data flow, the tunnel or tunnels for which the residual bandwidth is the lowest out of the static tunnels able to transport the data flow are selected and, when several static tunnels able to transport the data flow have the same residual bandwidth, the tunnel or tunnels for which the reserved bandwidth is the lowest are selected and, when several tunnels are able to transport the data flow and have the same reserved bandwidth, the static tunnel for which the delay is the greatest is selected.

Thus, an effort is made to use the resources allocated to a static tunnel in the telecommunication network optimally.

The invention also relates to a computer program stored on an information medium, said program comprising instructions for implementing the method described previously, when it is loaded and run by a computer system.

BRIEF DESCRIPTION OF THE DRAWINGS

The abovementioned characteristics of the invention, and others, will become more clearly apparent from reading the description that follows of an exemplary embodiment, said description being given in relation to the appended drawings, in which:

FIG. 4 represents an example of the content of the static tunnel table of the agent for allocating and distributing data flows in the tunnels;

FIG. 5 represents an example of the content of the table of flows admitted from the agent for allocating and distributing data flows in the tunnels.

FIG. 1 represents a telecommunication network using the MPLS protocol wherein the present invention is implemented.

DETAILED DESCRIPTION OF THE DRAWINGS

Figure 1:
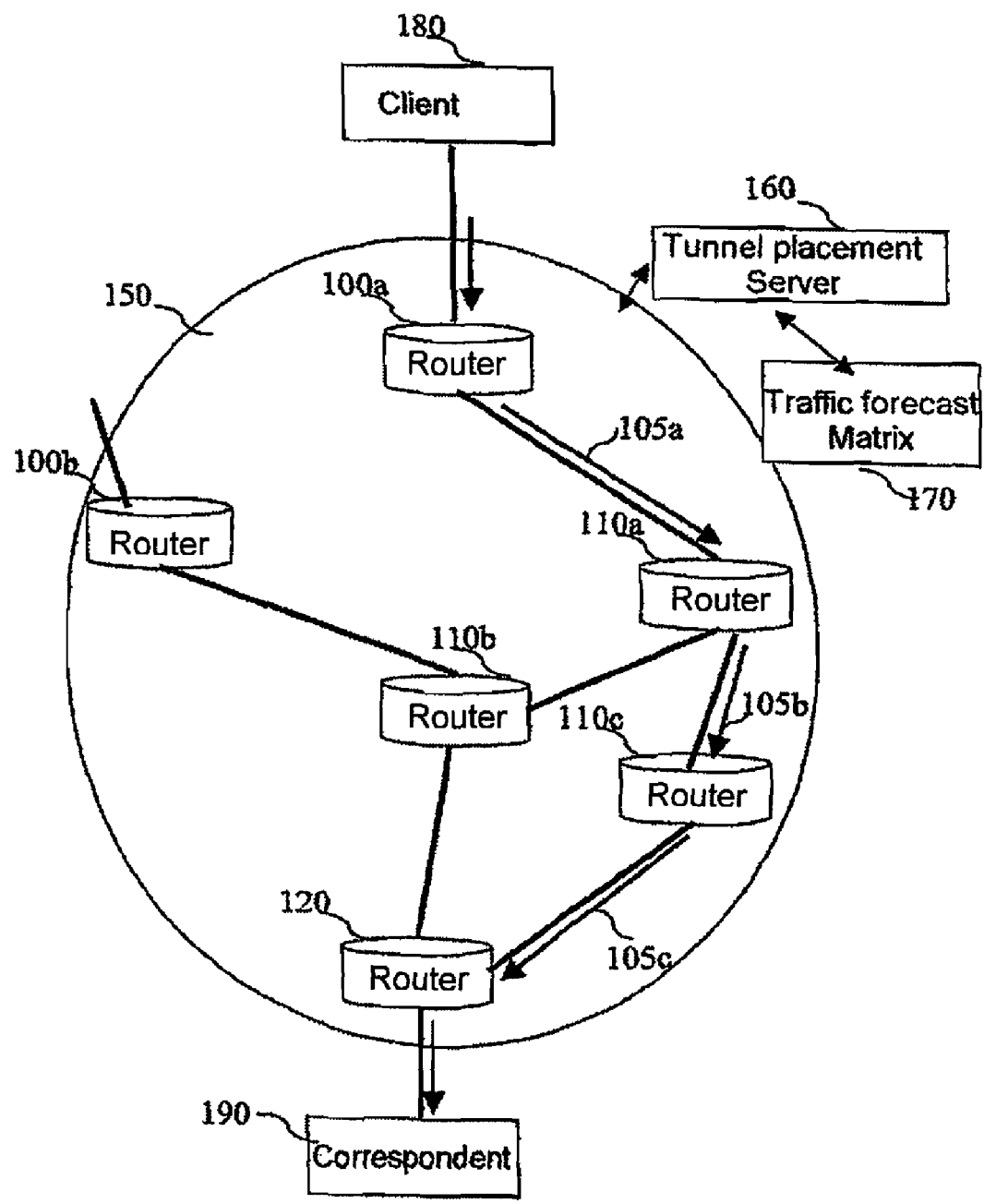
FIG. 1 represents a telecommunication network using the MPLS protocol in which the present invention is implemented.

In the label-switched telecommunication network 150, the creation of DS-TE tunnels between the edge routers of the network is performed both centrally by a tunnel placement server 160 and in a distributed way by each ingress edge router 100 of the MPLS network 150. In practice, two types of DS-TE tunnels are used in the system according to the present invention. The first type of DS-TE tunnels, called static tunnels, are calculated and set up by the tunnel placement server 160 according to traffic forecasts in the MPLS network 150 and traffic statistics. The traffic forecasts and statistics are supplied to the tunnel placement server 160 by a traffic forecast matrix 170. These static tunnels are preferably used when the data flows passing through the MPLS network 150 are in accordance with the forecasts and statistics. The tunnel placement server 160 determines the static tunnels and their constraints in a coordinated way to optimize the use of resources of the MPLS network 150. The determination of the static tunnels in the MPLS network 150 is performed periodically by the tunnel placement server 160. In practice, such a determination requires lengthy calculations, primarily when the MPLS network 150 is large. Only the tunnel placement server 160 can modify the parameters of the static tunnels.

The second type of DS-TE tunnels, called dynamic tunnels, are set up by an ingress edge 100 of the MPLS network 150 when the data flows needing to pass through the MPLS network 150 exceed the forecasts, and therefore when the static tunnels are congested.

Each ingress 100 or egress 120 edge router comprises the means for implementing the present invention. These means are activated in an edge router when a client 180 attached to said edge router wants a session to be set up with a correspondent 190. In this case, the ingress edge router 100 is the edge router to which the client is attached, the egress edge router 120 is the edge router to which the correspondent is attached.

It should be noted here that, in the interests of simplifying FIG. 1, just one client 180 and just one correspondent are shown in FIG. 1. Naturally, a large number of clients and correspondents are attached to the ingress edge routers 100 and the egress edge routers 120 of the MPLS network 150.

Figure 2:
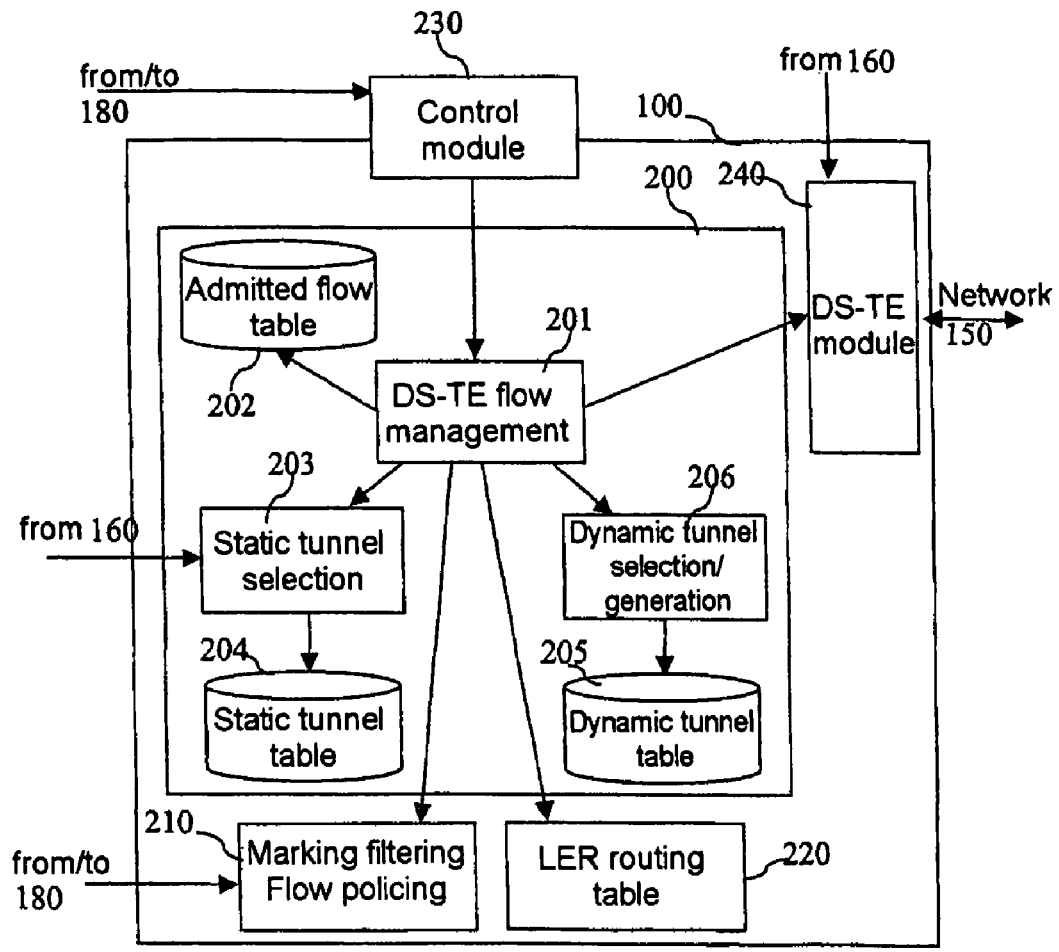
FIG. 2 is a functional representation of an edge router according to the present invention.

FIG. 2 gives a functional representation of an edge router according to the present invention.

A DS-TE tunnel, denoted td, is used to route one or more DS-TE data flows having the same characteristics as those of the DS-TE tunnel between clients attached to the same ingress edge router and correspondents attached to the same egress edge router. A DS-TE tunnel is assigned a service class. A DS-TE tunnel provides a precise quality of service, it is characterized by the following parameters: the address of the ingress or source edge router denoted @s_t(td), in the sense that the ingress edge router is the initiator of the session according to the RSVP-TE protocol, the address of the egress or receiving edge router denoted @d_t(td) in the sense that the egress edge router is the recipient of the session according to the RSVP-TE protocol, the logical identifier according to the RSVP-TE protocol, the bidirectionality or otherwise of the tunnel, the DiffServ service class denoted c_t(td), the reserved bandwidth of the tunnel denoted bp_t(tf) and the transit delay denoted d_t(td). RSVP-TE is an acronym for the signaling protocol (Resource reSerVation Protocol for Traffic Engineering). A description of the RSVP-TE protocol can be found in recommendation RFC 3209 published by D. Adwuche et al. entitled "RSVP-TE: extensions to RSVP for LSP tunnels", available from the IETF site. A DiffServ service class is a class defining priorities. The DiffServ classes are described in the IETF recommendation RFC 2475 entitled "An architecture for Differentiated Services".

A DS-TE tunnel is set up between an ingress edge router 100 which initiates the signaling for the tunnel and an egress edge router 120 which terminates the signaling for the tunnel. This tunnel is set up by the ingress edge router 100. Two edge routers can be linked by a plurality of tunnels, for example one tunnel for each service class.

A DS-TE data flow is a set of packets that is exchanged between two applications. This data flow is aggregated in a DS-TE tunnel between the ingress edge router 100 to which the client 180 is attached and the egress edge router 120 to which the correspondent 190 is attached.

A DS-TE data flow can be unidirectional or bidirectional, it is characterized by the following parameters:
the flow number denoted id_f(fd);
the five network identification parameters that are the address of the source client denoted @s_f(fd), the destination address of the correspondent denoted @d_s(fd), the protocol used denoted pr(fd), the port number of the source client denoted ps(fd) and the destination port number of the correspondent denoted pd(fd);
the bidirectionality or otherwise of the flow denoted b_f(fd)
the three quality of service parameters that are the bandwidth denoted bp_f(fd), the transit delay denoted d_f(fd) and the DiffServ service class denoted c_f(fd).

According to the invention, a DS-TE tunnel is characterized by two new parameters: the logical bandwidth denoted bplu(td) used in the tunnel which corresponds to the sum of the bandwidths of the DS-TE data flows routed in the tunnel td and the residual bandwidth denoted bpr(td) of a DS-TE tunnel which corresponds to the difference between the bandwidth reserved by the tunnel td in the network denoted bp(td) and the logical bandwidth bplu(td) used in the tunnel.

According to the invention, a tunnel td can be used to route a new DS-TE data flow if and only if the clients are connected to the same ingress edge router 100 and the correspondents or recipients 190 to the same egress edge router 120, the direction of the DS-TE data flow b_f(fd) corresponds to the direction of the tunnel, the service class of the DS-TE data flow corresponds to the service class of the tunnel, the bandwidth of the data flow is less than or equal to the residual bandwidth of the tunnel, the transit delay of the tunnel is less than or equal to the transit delay of the data flow.

An ingress edge router 100 comprises a control module 230. The control module 230 receives session setup requests from clients 180 who are associated with the ingress edge router 100. The control module 230 determines whether a client 180 is accredited to request the setting up of data flow transfer sessions and, if so, transfers the request to the DS-TE flow management module 201 of the agent for allocating and distributing the data flows in the tunnels 200. The accreditation is, for example, checked by consulting the service provider, not shown in FIG. 1, to which the client 180 having sent the request subscribes. It should be noted here that the control module 230 can, as a variant, not be incorporated in the ingress edge router 100.

The ingress edge router 100 comprises a DS-TE module 240. The DS-TE module 240 is informed as to the topology of the network and the constraints affecting the different links of the MPLS network 150. The DS-TE module 240 determines and transmits to the neighboring routers 110a or 10b messages indicating its immediate links and the constraints (or attributes) that are associated with them. These messages are then propagated from router to router by extended IGP messages, according to a flooding mechanism until all the routers are informed. Thus, each router has its own database (called TED for traffic engineering database) giving it the topology of the network and its constraints. The DS-TE module 240 is able to determine the label-switched path for example by means of the Dijkstra algorithm, that is the shortest path satisfying all the constraints (Constraint Shortest Path First or CSPF). The DS-TE module 240 is able to signal the determined path to the routers of the LSP path by means of the RSVP-TE signaling protocol. The DS-TE module 240 receives the information representative of the various static tunnels created by the tunnel placement server 160.

The ingress edge router 100 also comprises a data flow filtering and policing module 210. The data flow filtering and policing module 210 is able to authorize the transfer of the data flows transmitted by a client 180 over the MPLS network 150 and for limiting the data rate of the data flows to the data rate that it is allowed. The data flow filtering and policing module 210 is controlled by the DS-TE data flow management module 201 of the agent for allocating and distributing data flows in the tunnels 200.

The ingress edge router 100 also comprises a routing table 220 which determines, when a packet is received from a client 180 by the ingress edge router 100, the labeling of the latter.

The ingress edge router 100 comprises, according to the invention, an agent for allocating and distributing data flows in the tunnels 200. The agent for allocating and distributing data flows in the tunnels 200 controls the admission and the allocation of the DS-TE data flows in the static and dynamic tunnels of the MPLS network 150. The agent for allocating and distributing data flows in the tunnels 200 creates dynamic tunnels in the MPLS network 150 when the static tunnels of the MPLS network 150 are congested.

The agent for allocating and distributing data flows in the tunnels 200 comprises an admitted flow table 202, a static tunnel selection module 203, a static tunnel table 204, a dynamic tunnel selection and/or generation module 206, a dynamic tunnel table 205 and a DS-TE data flow management module 201.

The DS-TE data flow management module 201 processes the data flow transfer requests from the control module 230 previously described. The DS-TE data flow management module 201 orders the static tunnel selection module 203 to search in the static tunnel table 204 for a static tunnel able to transport the data flow. The static tunnel selection module 203 returns the result of the search to the DS-TE data flow management module 201. The DS-TE data flow management module 201 orders the dynamic tunnel selection and/or generation module 206 to search in the dynamic tunnel table 205 for a dynamic tunnel able to transport the data flow, or generates a dynamic tunnel able to transport the data flow.

The static 204 and dynamic 205 tunnel tables respectively store all the static and dynamic tunnels created in the MPLS network 150, and their respective parameters.

The admitted data flow table 202 stores, for each of the data flows admitted by the DS-TE flow management module 201 the parameters of the data flow, the identifier of the tunnel transporting said data flow and the identifier of the egress edge router 120.

When the tunnel placement server 160 creates static tunnels in the MPLS network 150, the latter and their parameters are transferred to the static tunnel selection module 203 which updates the static tunnel table 204.

Figure 3:
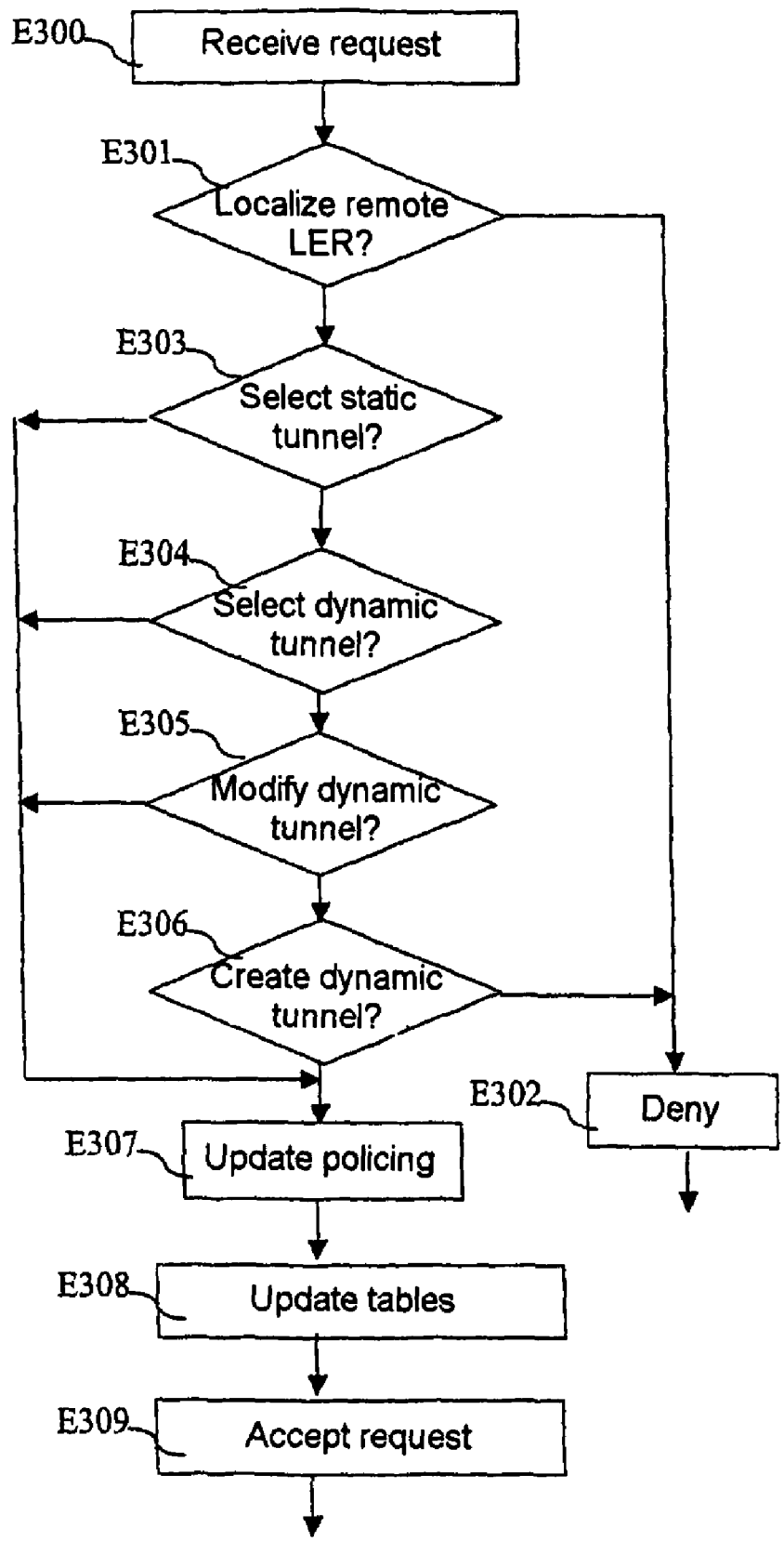
FIG. 3 represents the algorithm run by the agent for allocating and distributing data flows in the tunnels included in an edge router according to the present invention.

FIG. 3 represents the algorithm run by the agent for allocating and distributing data flows in the tunnels included in an edge router according to the present invention.

When a client 180 transfers a data flow setup request to the control module 230, the control module 230, subject to a check on the authorization of the client 180 to request such a setup, transfers the request to the DS-TE data flow management module 201 of the agent for allocating and distributing data flows in the tunnels.

In the step E300, the DS-TE data flow management module 201 receives the admission request which comprises the data flow parameters that are the flow number id_f(fd), the address of the source client 180 @s_f(fd), the destination address of the correspondent 190 @d_f(fd), the protocol used pr(fd), the port number of the source client 180 ps(fd), the destination port number of the correspondent 190 pd(fd), the bidirectionality or otherwise of the flow b_f(fd) and the three quality of service parameters that are the bandwidth bp_f(fd), the transit delay d_f(fd) and the DiffServ service class c_f(fd).

In the next step E301, the DS-TE data flow management module 201 determines the egress edge router 120 to which the recipient 190 of the data flow is attached. The DS-TE data flow management module 201 determines the egress edge router 120 by interrogating the routing table 220 of the ingress edge router and using as key the address of the correspondent @d_f(fd). If no egress edge router 120 is associated with the destination address of the correspondent @d_f(fd), the DS_TE data flow management module 201 goes onto the step E302 and transfers a data flow set up denial message to the control module 230. This message preferably comprises information representative of the failure to identify the egress edge router 120. This message is then transferred by the control module 230 to the client 180 having made the request. When the step E302 is completed, the DS-TE data flow management module 201 stops the present algorithm and returns to the step E300 pending a new admission request to be processed. If the egress edge router 120 is determined, the DS-TE data flow management module 201 goes onto the step E303.

In the step E303, the DS-TE data flow management module 201 determines whether a static tunnel generated by the tunnel placement server 160 according to information delivered by the traffic forecast matrix 170 is able to handle the transfer of the data flow. For this, the DS-TE data flow management module 201 transfers to the static tunnel selection module 203 the parameters of the data flow that are the bidirectionality or otherwise of the flow bp_f(fd), the identifier of the egress edge router 120 previously determined in the step E302 and the three quality of service parameters that are the bandwidth bp_f(fd), the transit delay d_f(fd) and the DiffServ service class c_f(fd).

The static tunnel selection module 203 consults the static tunnel table 204 and determines whether a static tunnel is able to handle the transfer of the data flow. One example of the content of the static tunnel table is represented in FIG. 4.

The table of FIG. 4 comprises three lines denoted 40 to 42 and seven columns denoted 43 to 49. Each static tunnel created by the tunnel placement server 160 has a corresponding line in the table of FIG. 4. In the interests of simplicity, only three tunnels are represented in FIG. 4. Line 40 comprises the parameters of the tunnel denoted tunnel 1, line 41 comprises the parameters of the tunnel denoted tunnel 2 and line 42 comprises the parameters of the tunnel denoted tunnel 3. Naturally, more tunnels are created in the MPLS network 150. Column 43 comprises the identifier @d_t of the egress edge router of tunnels 1, 2 and 3, column 44 comprises the DiffServ class c_t(td) of tunnels 1, 2 and 3, column 45 comprises the reserved bandwidth of the tunnel bp_t(tf) of tunnels 1, 2 and 3, column 46 comprises the transit delay d_t(td) of tunnels 1, 2 and 3, column 47 comprises the logical bandwidth denoted bplu(td) used in tunnels 1, 2 and 3, column 48 comprises the parameter b_t(td) representative of the direction of tunnels 1, 2 and 3 and column 49 comprises the residual bandwidth bpr(td) of tunnels 1, 2 and 3.

The static tunnel selection module 203 determines whether at least one static tunnel is able to handle the transfer of the data flow by comparing the parameters of the data flow with the parameters of each tunnel included in the static tunnel table. A static tunnel is able to transport a data flow if @d_t is equal to the identifier of the egress edge router determined in the step E302, the DiffServ class c_t(td) is at least greater than the DiffServ class c_f(fd), b_t(td) comprises at least b_f(td), the transit delay d_t(td) is less than or equal to d_f(fd) and finally if the residual bandwidth bpr(td) is greater than or equal to bp_f(fd).

It should be noted here that, in a preferred embodiment, and when several tunnels are able to transport the data flow, the static tunnel selection module 203 selects the static tunnel for which the residual bandwidth bplu(td) is the lowest out of the static tunnels able to transport the data flow. When several static tunnels are able to transport the data flow and have the same residual bandwidth, the static tunnel selection module 203 selects the static tunnel for which the reserved bandwidth bp_t(td) is the lowest. When several static tunnels are able to transport the data flow and have the same reserved bandwidth, the static tunnel selection module 203 selects the static tunnel for which the d_t(td) is the greatest.

When the static tunnel selection module 203 has selected a static tunnel, the latter updates the static tunnel table 204 by modifying the parameters of the tunnel in columns 47 and 49 of FIG. 4. The bplu parameter is increased by the bandwidth of the data flow and the bpr parameter is decremented by the bandwidth of the data flow. The static tunnel selection module 203 then transfers a response message comprising the identifier of the selected tunnel to the DS-TE data flow management module 201.

On receiving this message, the static tunnel selection module 203 goes onto the step E307 which consists in updating the flow marking and policing module 210 previously described for the latter to authorize the transfer of the data flow.

When this operation is completed, the static tunnel selection module 203 goes onto the step E308 which consists in updating the routing table 220 and the admitted flow table 202 by inserting the data flow, the identifier of the tunnel selected from the latter and the bandwidth of the data flow. One example of the admitted flow table 202 is represented in FIG. 5.

FIG. 5 comprises three lines denoted 500 to 502 and eleven columns denoted 510 to 520. Each data flow admitted by the DS-TE data flow management module 201 has a corresponding line in the table of FIG. 5. In the interests of simplicity, only three data flows are represented in FIG. 5, line 500 comprises the parameters of the data flow denoted Flow 1, line 501 comprises the parameters of the data flow denoted Flow 2 and line 502 comprises the parameters of the data flow denoted Flow 3. Of course, more data flows are allowed in the MPLS network 150. Column 510 comprises the address of the source client @s_f(fd) of Flows 1, 2 and 3, column 511 comprises the destination address of the correspondent @d_s (fd) of Flows 1, 2 and 3, column 512 comprises the protocol used pr(fd) by Flows 1, 2 and 3, column 513 comprises the port number of the source client ps(fd) of Flows 1, 2 and 3, column 514 comprises the destination port number of the correspondent pd(fd) of Flows 1, 2 and 3, column 515 comprises the DiffServ service class c_f(fd) of Flows 1, 2 and 3, column 516 comprises the bandwidth bp_f(fd) of Flows 1, 2 and 3, column 517 comprises the transit delay d_f(fd) of Flows 1, 2 and 3, column 518 comprises the identifier of the egress edge router determined in the step E301 of Flows 1, 2 and 3, column 519 comprises the identifier of the tunnel selected to handle the transport of the data flows Flows 1, 2 and 3 and column 520 comprises information indicating whether the data flows Flows 1, 2 and 3 are respectively bidirectional or unidirectional.

When this operation is completed, the DS-TE data flow management module 201 goes onto the step E309 which consists in generating a data flow setup acceptance message to the client 180 having initiated the request via the control module 230.

When this step is completed, the DS-TE data flow management module 201 stops the present algorithm and returns to the step E300 pending a new admission request to be processed.

If, in the step E303, the static tunnel selection module 203 determines that none of the static tunnels is able to handle the transfer of the data flow, the latter returns a failure message to the DS-TE data flow management module 201. Such is, for example, the case when all the capacities of the static tunnels are used, that is, when the requests from the clients 180 are greater than the traffic forecasts and statistics supplied to the tunnel placement server 160 by the traffic forecast matrix 170. On receiving this message, the DS-TE data flow management module 201 goes onto the step E304.

In the step E304, the DS-TE data flow management module 201 determines whether a dynamic tunnel previously generated by the dynamic tunnel selection and/or generation module 206 is able to handle the transfer of the data flow. For this, the DS-TE data flow management module 201 transfers to the dynamic tunnel selection and/or generation module 206 the parameters of the data flow that are the bidirectionality or otherwise of the flow b_f(fd), the identifier of the egress edge router 120 previously determined in the step E302 and the three quality of service parameters that are the bandwidth bp_f(fd), the transit delay d_f(fd) and the DiffServ service class c_f(fd).

The dynamic tunnel selection and/or generation module 206 consults the dynamic tunnel table 205 and determines whether a dynamic tunnel is able to handle the transfer of the data flow. The dynamic tunnel table comprises the same parameters as those contained in the static tunnel table, as represented in FIG. 4, so it will not be described in any more detail.

The dynamic tunnel selection and/or generation module 206 determines whether at least one dynamic tunnel is able to handle the transfer of the data flow by comparing the parameters of the data flow with the parameters of each tunnel contained in the dynamic tunnel table 205. A dynamic tunnel is able to transport a data flow if @d_t is equal to the egress edge router identifier determined in the step E302, the Diff-Serv class c_t(td) is at least greater than the DiffServ class c_f(fd), b_t(td) comprises at least b_f(td), the transit delay d_t(td) is less than or equal to d_f(fd) and finally if the residual bandwidth bpr(td) is greater than or equal to bp_f (fd).

It should be noted here that, in a preferred embodiment, and when several tunnels are able to transport the data flow, the dynamic tunnel selection and/or generation module 206 selects the dynamic tunnel for which the residual bandwidth bpr(td) is the lowest out of the dynamic tunnels able to transport the data flow. When several dynamic tunnels are able to transport the data flow and have the same residual bandwidth, the dynamic tunnel selection and/or generation module 206 selects the dynamic tunnel for which the reserved bandwidth bp_t(td) is the lowest. When several dynamic tunnels are able to transport the data flow and have the same reserved bandwidth, the dynamic tunnel selection and/or generation module 206 selects the dynamic tunnel for which the delay d_t(td) is the greatest.

When the dynamic tunnel selection and/or generation module 206 has selected a dynamic tunnel, the latter updates the dynamic tunnel table 205 by modifying the parameters of the selected tunnel. The bplu parameter is increased by the bandwidth of the data flow and the bpr parameter is decremented by the bandwidth of the data flow. The dynamic tunnel selection and/or generation module 206 then transfers a response message comprising the identifier of the selected tunnel to the DS-TE data flow management module 201 and the identifier of the destination edge router. On receiving this message, the DS-TE data flow management module 201 goes onto the step E307 which consists in updating the flow marking and policing module 210 for the latter to authorize the transfer of the data flow.

When this operation is completed, the DS-TE data flow management module 201 goes onto the step E308 and updates the routing table 220 and the admitted flow table 202 by inserting the data flow, the identifier of the tunnel selected from the latter and the bandwidth of the data flow.

When this operation is completed, the DS-TE data flow management module 201 goes onto the step E309 which consists in generating a data flow setup acceptance message to the client 180 having initiated the request via the control module 230.

When this step is completed, the DS-TE data flow management module 201 stops the present algorithm and returns to the step E300 pending a new admission request to be processed.

When no dynamic tunnel is able to transport the data flow, the dynamic tunnel selection and/or generation module 206 goes on from the step E304 to the next step E305. In this step, the dynamic tunnel selection and/or generation module 206 tries to modify the bandwidth of one of the dynamic tunnels referenced in the dynamic tunnel table 205.

According to the invention, four parameters are used to modify the bandwidth of a dynamic tunnel: the bandwidth increment denoted IBD corresponding to the increment step that can be made for a dynamic tunnel, the minimum bandwidth BDMIN which can be reserved for a dynamic tunnel, the maximum bandwidth denoted BDMAX which corresponds to the maximum bandwidth that can be reserved for a dynamic tunnel and, finally, the bandwidth decrement denoted DBD corresponding to the decrementation step which can be made for a dynamic tunnel.

For this, the dynamic tunnel selection and/or generation module 206 determines from the dynamic tunnel table 205 which are the dynamic tunnels that are able to transport the data flow if their reserved bandwidth bp_t (td) is increased by the increment IBD. If no dynamic tunnel is able to transport the data flow if its reserved bandwidth bp_t (td) is increased by the increment IBD, the dynamic tunnel selection and/or generation module 206 goes onto the step E306 which will be described later. If there is at least one dynamic tunnel that is able to transport the data flow if its reserved bandwidth bp_t (td) is increased by the increment IBD, the dynamic tunnel selection and/or generation module 206 determines whether the dynamic tunnel or tunnels that are able to transport the data flow, if their reserved bandwidth bp_t(td) is increased by the increment IBD, have an increased bandwidth less than BDMAX. The dynamic tunnels that have an increased bandwidth less than BDMAX are then selected.

If no dynamic tunnel has an increased bandwidth less than BDMAX, the dynamic tunnel selection and/or generation module 206 goes onto the step E306.

The DS-TE flow management module 201 interrogates the DS-TE module 240 for the latter to determine whether the routing of each selected tunnel should or should not be modified in the MPLS network 150. This is performed by the module determining the shortest path that satisfies the set of constraints CSPF (Constraint Shortest Path First). If the routing of each selected tunnel has to be modified, the dynamic tunnel selection and/or generation module 206 goes onto the step E306.

If the selected tunnels include a tunnel for which the routing must not be modified, the dynamic tunnel selection and/or generation module 206 selects the dynamic tunnel that has the lowest reserved bandwidth and modifies the reserved bandwidth of this dynamic tunnel by adding to the latter the value of the increment IBD. The dynamic tunnel selection and/or generation module 206 modifies the dynamic tunnel table 205 and notifies the DS-TE module 240 of the modification of this dynamic tunnel for the DS-TE module 240 to update the configuration of this tunnel.

When this operation is completed, the dynamic tunnel selection and/or generation module 206 then transfers a response message comprising the identifier of the selected tunnel to the DS-TE data flow management module 201 and the identifier of the destination edge router. On receiving this message, the DS-TE data flow management module 201 goes onto the step E307.

The steps E307 to E309 are run in the same way as that described previously, so they will not be explained any further.

When these steps are completed, the DS-TE data flow management module 201 stops the present algorithm and returns to the step E300 pending a new admission request to be processed.

In the step E306, the DS-TE flow management module 201 interrogates the DS-TE module 240 for the latter to determine the greatest available bandwidth in the MPLS network 150 that is able to satisfy the criteria of the data flow. This greatest available bandwidth is denoted pgbpd and is determined by the module for determining the shortest path that satisfies the set of constraints CSPF.

In this step, the dynamic tunnel selection and/or generation module 206 tries to create a new dynamic tunnel in the MPLS network 150. For this, the dynamic tunnel selection and/or generation module 206 compares the greatest available bandwidth in the MPLS network 150 that is able to satisfy the criteria of the data flow with the minimum bandwidth BMIN that can be reserved for a dynamic tunnel. If the greatest available bandwidth pgbpd is less than BMIN, the attempt to create a new dynamic tunnel fails and the dynamic tunnel selection and/or generation module 206 transfers a failure message to the DS-TE data flow management module 201. On receiving this message, the DS-TE data flow management module 201 goes onto the step E302 and transfers a session setup denial message to the control module 230. This message preferably comprises information representative of the congestion of the resources of the MPLS network 150. This message is then transferred by the control module 230 to the client 180 having made the request. When the step E302 is completed, the DS-TE data flow management module 201 stops the present algorithm and returns to the step E300 pending a new admission request to be processed.

If the greatest available bandwidth pgbpd is greater than BMIN but less than the bandwidth bp_f(fd) of the data flow, the attempt to create a new dynamic tunnel fails and the dynamic tunnel selection and/or generation module 206 transfers a failure message to the DS-TE data flow management module 201. On receiving this message, the DS-TE data flow management module 201 goes onto the step E302 and transfers to the control module 230 a session setup denial message preferably comprising information representative of the congestion of the resources of the MPLS network 150. This message is then transferred by the control module 230 to the client 180 having made the request. When the step E302 is completed, the DS-TE data flow management module 201 stops the present algorithm and returns to the step E300 pending a new admission request to be processed.

If the greatest available bandwidth pgbpd is greater than BMIN and the bandwidth bp_f(fd) of the data flow, the dynamic tunnel selection and/or generation module 206 controls the DS-TE module 240 for the latter to configure a new dynamic tunnel for which the bandwidth is equal to the maximum of BMIN and bp_f(fd), or Max(BMIN, bp_f(fd)). This new dynamic tunnel is able to support the parameters of the data flow to be transported. When the dynamic tunnel is created, the DS-TE module 240 returns a configuration confirmation message to the dynamic tunnel selection and/or generation module 206. The dynamic tunnel selection and/or generation module 206 modifies the dynamic tunnel table 205 so as to include the latter in the table. The bandwidth parameters for this new dynamic tunnel are bp_t(td)=Max (BMIN, bp_f(fd)), bplu(td)=bp_f(fd) and bpr(td)=Max(BMIN, bp_f (fd))−bp_f(fd). The dynamic tunnel selection and/or generation module 206 transfers these informations to the flow management module 201 which updates the admitted flow table 202 by associating the data flow with the newly created dynamic tunnel. The identifier of the created tunnel is transferred to the flow management module 201. When this operation is completed, the algorithm goes onto the step E307.

In the step E307, the DS-TE data flow management module 201 updates the flow marking and policing module described previously for the latter to authorize the transfer of the data flow by the ingress edge router 100.

When this operation is completed, the DS-TE data flow management module 201 goes onto the step E308 which consists in updating the routing table 220 and the admitted flow table 202 by inserting the data flow and the identifier of the selected tunnel in the latter.

When this operation is completed, the DS-TE data flow management module 201 goes onto the step E309 which consists in generating an acceptance message to the client 180 having initiated the request via the control module 230.

When this is step is completed, the DS-TE data flow management module 201 stops the present algorithm and returns to the step E300 pending a new admission request to be processed.

When an ingress edge router receives a request to close a data flow transported by a static tunnel, the DS-TE data flow management module 201 updates the admitted flow table 202 by deleting this data flow from the latter and updates the flow marking and policing filtering module 210 and the routing table of the LER 220. The DS-TE data flow management module 201 controls the static tunnel selection module 203 for the latter to modify the static tunnel table 204.

When an ingress edge router receives a request to close a data flow transported by a dynamic tunnel, the DS-TE data flow management module 201 controls the dynamic tunnel selection and/or generation module 206 for the latter to modify the dynamic tunnel table 205. The logical bandwidth bplu(td) used in the tunnel is decremented by the bandwidth of the data flow to be deleted and the residual bandwidth bpr(td) of the tunnel is increased by the bandwidth of the data flow to be deleted.

If the residual bandwidth bpr(td) in the tunnel is greater than the bandwidth decrement DBD, the reserved bandwidth of the dynamic tunnel is decremented by DBD. It should be noted here that, preferably, the DBD value is greater than IBD. This makes it possible to avoid any risk of oscillation with regard to the definition of the reserved bandwidth of the dynamic tunnels created and modified in accordance with the present invention.

It should be noted here that, when a dynamic tunnel no longer transports data flows, that is, when the logical bandwidth bplu(td) used in the tunnel is zero, the dynamic tunnel is deleted by the dynamic tunnel selection and/or generation module 206.

Naturally, the present invention is by no means limited to the embodiments described here, but, on the contrary, encompasses any variant within the scope of those skilled in the art.

What is claimed is:

1. A method of creating a tunnel for transporting at least one data flow in a label-switched telecommunication network, the telecommunication network comprising at least one ingress edge router able to create dynamic tunnels and a server able to create static tunnels in the telecommunication network, the static tunnels being created based on traffic forecasts in the telecommunication network, said method comprising:

receiving, at an ingress edge router, an admission request from a client to transfer a specified data flow in the telecommunication network, determining, in the ingress edge router, whether there exists a static tunnel defined by the server in the telecommunication network that is able to transport the data flow specified in the admission request, and creating, using the ingress edge router, a dynamic tunnel able to transport the data flow in the telecommunication network if there is no static tunnel defined by the server that is able to transport the data flow.

2. The method as claimed in claim 1, wherein each tunnel has parameters associated with it, the parameters comprising service class, tunnel reserved bandwidth and transit delay parameters.

3. The method as claimed in claim 1, wherein, prior to the step for creating a dynamic tunnel, the method comprises a step for determining whether the dynamic tunnels created previously include at least one dynamic tunnel able to transport the data flow.

4. The method as claimed in claim 3, wherein if no dynamic tunnel set up previously is able to transport the data flow, the method also comprises a step, executed prior to the step for creating a dynamic tunnel, for determining whether the dynamic tunnels created previously include at least one dynamic tunnel able to transport the data flow if the reserved bandwidth of said tunnel is increased by a predetermined value.

5. The method as claimed in claim 4, wherein, if the dynamic tunnels created previously include at least one dynamic tunnel able to transport the data flow if the reserved bandwidth of said tunnel is increased by a predetermined value, the method also comprises a step for comparing the reserved bandwidth of said tunnel increased by a predetermined value with a predetermined threshold, and selecting the tunnel or tunnels for which the reserved bandwidth increased by a predetermined value is less than a predetermined threshold.

6. The method as claimed in claim 5, wherein the method also comprises the steps for determining whether the routing of the selected tunnel or tunnels in the label-switched telecommunication network needs to be modified, and selecting the tunnel or tunnels for which the routing in the label-switched telecommunication network must not be modified.

7. The method as claimed in claim 3, wherein a tunnel is characterized at least by a residual bandwidth and, when several tunnels for which the routing in the label-switched telecommunication network must not be modified are selected, the method comprises a step for selecting, from the dynamic tunnels for which the routing in the label-switched telecommunication network must not be modified, the tunnel or tunnels for which the residual bandwidth is the lowest out of the dynamic tunnels able to transport the data flow and, when several dynamic tunnels able to transport the data flow have the same residual bandwidth, the method comprises a step for selecting the dynamic tunnel or tunnels for which the reserved bandwidth is the lowest and, when several dynamic tunnels are able to transport the data flow and have the same reserved bandwidth, the method comprises a step for selecting the dynamic tunnel for which the transit delay is the greatest.

8. The method as claimed in claim 1, wherein the data flow is intended for a correspondent of the client, the telecommunication network comprises at least one egress edge router with which the correspondent of the client is associated and in that each tunnel also has associated with it the address of an ingress edge router, the address of an egress edge router, the bidirectionality or otherwise of said tunnel, the logical bandwidth used in the tunnel corresponding to the sum of the bandwidths of the data flows transported in the tunnel and the residual bandwidth of the tunnel corresponding to the difference between the reserved bandwidth of the tunnel in the telecommunication network and the logical bandwidth used in the tunnel.

9. The method as claimed in claim 8, wherein each data flow has associated with it the address of the client, the address of the correspondent, the bidirectionality or otherwise of the flow, the bandwidth, the transit delay and the service class of said data flow.

10. The method as claimed in claim 9, wherein a tunnel is able to transport a data flow if the address of the egress edge router with which the correspondent of the client is associated is equal to the address of the egress edge router of the tunnel, the address of the ingress edge router with which the client is associated is equal to the address of the ingress edge router of the tunnel, the service class of the tunnel is at least greater than the service class of the data flow, the transit delay of the tunnel is less than or equal to the transit delay of the data flow and if the residual bandwidth of the tunnel is greater than or equal to the bandwidth of the data flow.

11. The method as claimed in claim 1, wherein, when several static tunnels are able to transport the data flow, the method comprises a step for selecting the static tunnel or tunnels for which the residual bandwidth is the lowest out of the static tunnels able to transport the data flow and, when several static tunnels able to transport the data flow have the same residual bandwidth, the method comprises a step for selecting the static tunnel or tunnels for which the reserved bandwidth is the lowest and, when several static tunnels are able to transport the data flow and have the same reserved bandwidth, the method comprises a step for selecting the static tunnel for which the transit delay is the greatest.

12. A device for creating a tunnel for transporting at least one data flow in a label-switched telecommunication network, the telecommunication network comprising at least one ingress edge router able to receive an admission request from a client to transfer a specified data flow in the telecommunication network, a server able to define static tunnels in the telecommunication network based on traffic forecasts in the telecommunication network, wherein the tunnel creation device is included in the at least one ingress edge router, the tunnel creation device comprising:
  means of determining whether there exists a static tunnel defined by the server in the telecommunication network that is able to transport the data flow specified in the admission request, and
  means of creating a dynamic tunnel suitable for transporting the data flow if there is no static tunnel defined by the server that is able to transport the data flow.

13. An ingress edge router in a label-switched telecommunication network comprising a dynamic tunnel creation device for creating a dynamic tunnel for transporting at least one data flow in the telecommunication network, the ingress edge router being configured to receive an admission request from a client to transfer a specified data flow in the telecommunication network, the telecommunication network including a server able to define static tunnels based on traffic forecasts in the telecommunication network, the tunnel creation device comprising:
  means of determining whether there exists a static tunnel defined by the server in the telecommunication network that is able to transport the data flow specified in the admission request, and
  means of creating a dynamic tunnel suitable for transporting the data flow if there is no static tunnel defined by the server that is able to transport the data flow.

14. A non-transitory computer-readable medium storing a computer program, the computer program having instructions which when executed by a processor perform a method of creating a tunnel for transporting at least one data flow in a label-switched telecommunication network, the telecommunication network comprising at least one ingress edge router able to create dynamic tunnels and a server able to create static tunnels in the telecommunication network, the static tunnels being created based on traffic forecasts in the telecommunication network, the method performed by the executed computer program instructions comprising the steps of:
  receiving, at an ingress edge router, an admission request from a client to transfer a specified data flow in the telecommunication network,
  determining, in the ingress edge router, whether there exists a static tunnel defined by the server in the telecommunication network that is able to transport the data flow specified in the admission request, and
  creating, using the ingress edge router, a dynamic tunnel able to transport the data flow in the telecommunication network if there is no static tunnel defined by the server that is able to transport the data flow.

15. A system for creating tunnels for transporting at least one data flow in a label-switched telecommunication network, the system comprising:
  at least one ingress edge router able to create dynamic tunnels and
  a server able to create static tunnels in the telecommunication network, the static tunnels being created based on traffic forecasts in the telecommunication network,
  wherein the ingress edge router is configured to receive an admission request from a client to transfer a specified data flow in the telecommunication network; determine whether there exists a static tunnel defined by the server in the telecommunication network that is able to transport the data flow specified in the admission request; and create a dynamic tunnel able to transport the data flow in the telecommunication network if there is no static tunnel defined by the server that is able to transport the data flow.

* * * * *